US012803820B2

(12) United States Patent
Watkins

(10) Patent No.: US 12,803,820 B2
(45) Date of Patent: Nov. 17, 2026

(54) SYSTEM AND METHOD FOR TRUST STORE INVENTORY AND MANAGEMENT

(71) Applicant: MASTERCARD INTERNATIONAL INCORPORATED, Purchase, NY (US)

(72) Inventor: Tim M. Watkins, Tacoma, WA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 47 days.

(21) Appl. No.: 19/075,773

(22) Filed: Mar. 10, 2025

(65) Prior Publication Data

US 2026/0270094 A1 Sep. 10, 2026

(51) Int. Cl.
*H04L 9/32* (2006.01)

(52) U.S. Cl.
CPC .................................. *H04L 9/3268* (2013.01)

(58) Field of Classification Search
CPC .................................................... H04L 9/3268
USPC ......................................................... 713/156
See application file for complete search history.

(56) References Cited

U.S. PATENT DOCUMENTS 7,949,606 B1 * 5/2011 Sweet .................... G06Q 30/06 705/902
2011/0252459 A1 * 10/2011 Walsh ................. H04L 63/0823 726/4
2017/0093587 A1 * 3/2017 Glisson ................. H04L 63/062
2018/0151007 A1 * 5/2018 Einberg ................... G07C 9/28
2021/0111907 A1 * 4/2021 Juma ...................... H04L 9/3268
2022/0085983 A1 * 3/2022 Hillier .................... H04L 9/0866
2023/0120616 A1 * 4/2023 Preimesberger ...... H04L 9/3247 713/171
2025/0007902 A1 * 1/2025 Kalidas ............... H04L 63/0823
2025/0088497 A1 * 3/2025 Bajpai ................. H04L 63/0823

* cited by examiner

*Primary Examiner* — Thanh T Le
(74) *Attorney, Agent, or Firm* — Barta Jones, PLLC

(57) ABSTRACT

Examples for managing a digital certificate inventory include dynamically identifying a trust store present on a host device, retrieving a key vault identifier, a vault label, and a machine certificate, causing the host device to transmit a secret request message to the key vault device, retrieving, from the trust store using the secret, a plurality of host digital certificates, storing the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device, and automatically creating and transmitting an alert message when a first host digital certificate stored in the certificates inventory database matches at least one alert criterion.

20 Claims, 5 Drawing Sheets

SYSTEM AND METHOD FOR TRUST STORE INVENTORY AND MANAGEMENT

BACKGROUND

A public key infrastructure (PKI) is a set of roles, policies, hardware, software, and procedures used to create, manage, distribute, use, store, and revoke digital certificates used in public-key encryption. One of the purposes of a PKI is to facilitate the secure electronic transfer of information for a range of online activities such as, for example, e-commerce, Internet banking, and confidential email. Public key encryption may replace or augment activities where simple passwords are inadequate (e.g., where more rigorous proof of identity confirmation is desired, to validate the information being transferred, or the like).

In public key infrastructure (PKI) systems, trusted digital certifications (or just “certs”) are added to trust stores on host systems supported by the PKI, and these saved certs are subsequently used (e.g., by applications on the respective local host system) to verify the identity of other entities with which that host system communicates (such as via secure socket layer (SSL) or transport layer security (TLS) protocol communications). Each cert includes a public key of a remote host (some other entity with which the local host communicates), and that cert is considered “trusted” by the local host after having been received through a verification process (typically from a Certificate Authority (CA), a trusted entity that issues such certs after verifying the identity of organizations or individuals associated with that target host). As such, on a given host, a local trust store often stores numerous certs of numerous remote hosts.

SUMMARY

Some examples provide a digital certificate management system. The digital certificate management system includes at least one processor; and at least one memory comprising computer-readable instructions, the at least one processor, the at least one memory and the computer-readable instructions configured to cause the at least one processor to: dynamically identify a trust store present on a host device; retrieve, from the host device, a key vault identifier, a vault label, and a machine certificate, the key vault identifier identifying a key vault device, the vault label identifying a secret stored by the key vault device, the machine certificate being usable to authenticate access to the secret; cause the host device to transmit a secret request message to the key vault device using the key vault identifier, the secret request message including the vault label and the machine certificate, thereby causing the key vault device to authenticate access to the secret based on the machine certificate and respond to the secret request message with the secret; retrieve, from the trust store using the secret, a plurality of host digital certificates associated with remote devices with which the host device is configured to communicate; store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

Other examples provide a computer-implemented method for managing a digital certificate inventory. The method includes: identifying a trust store and an application configuration file stored on a host device; reading, from the application configuration file, a key vault identifier, a vault label, and a machine certificate, the key vault identifier identifying a key vault device, the vault label identifying a secret stored by the key vault device, the machine certificate being usable to authenticate access to the secret; causing the host device to transmit a secret request message to the key vault device using the key vault identifier, the secret request message including the vault label and the machine certificate, thereby causing the key vault device to authenticate access to the secret based on the machine certificate and respond to the secret request message with the secret; causing the trust store to be accessed using the secret; causing a retrieving, from the trust store, of a plurality of host digital certificates associated with remote devices; storing the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically generating an alert message when a first host digital certificate stored in the certificates inventory database matches at least one alert criterion.

Still other examples provide computer storage medium having computer-executable instructions. Upon execution by a processor of a computer, the instructions cause the processor to at least: dynamically identify a trust store present on a host device; retrieve, from the host device, a key vault identifier, a vault label, and a machine certificate, the key vault identifier identifying a key vault device, the vault label identifying a secret stored by the key vault device, the machine certificate being usable to authenticate access to the secret; cause the host device to transmit a secret request message to the key vault device using the key vault identifier, the secret request message including the vault label and the machine certificate, thereby causing the key vault device to authenticate access to the secret based on the machine certificate and respond to the secret request message with the secret; retrieve, from the trust store using the secret, a plurality of host digital certificates associated with remote devices with which the host device is configured to communicate; store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
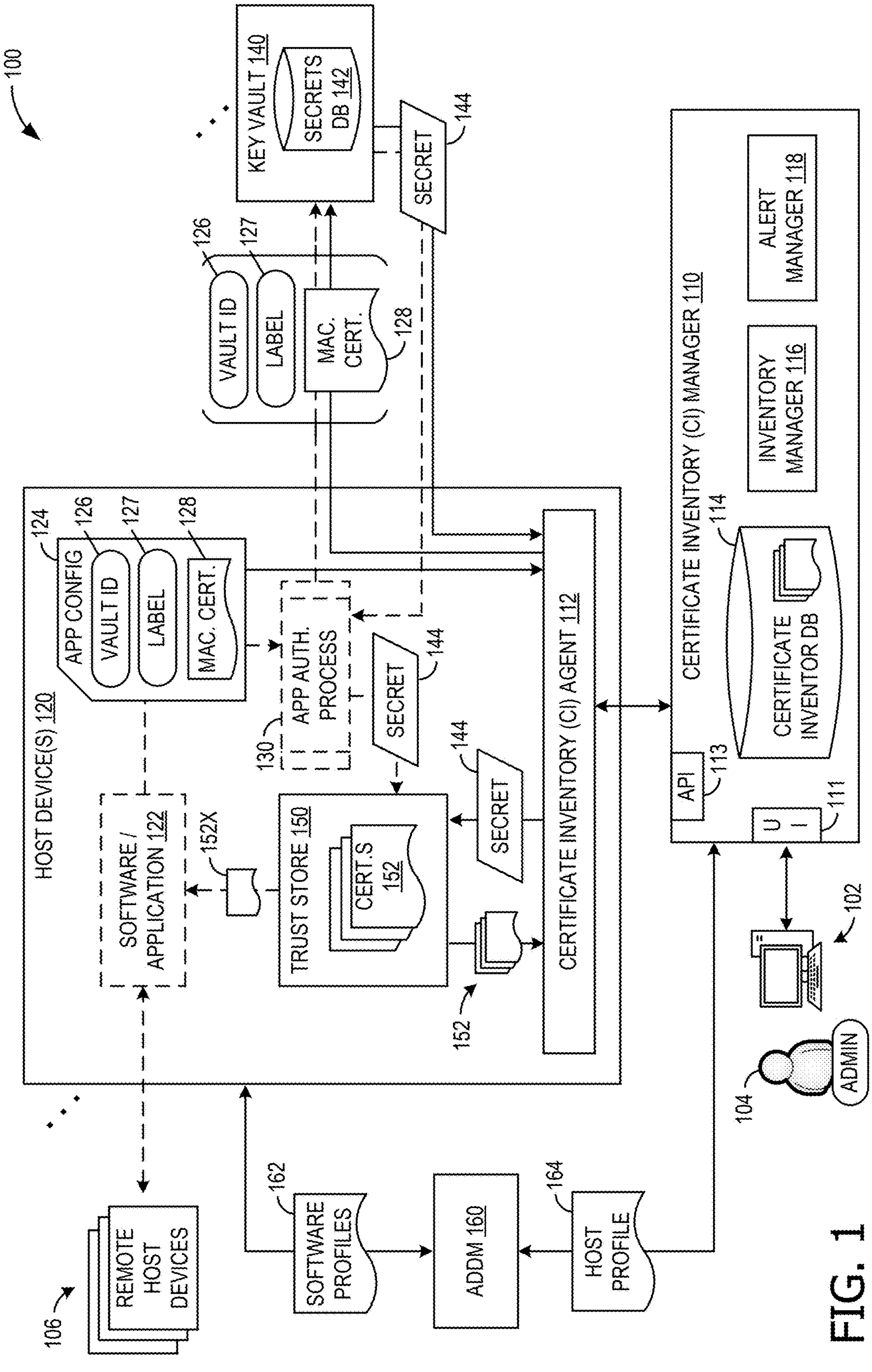
FIG. 1 is a block diagram of an example architecture and associated data flow for a certificate inventory (CI) system.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

In enterprise environments, typical PKI systems can include hundreds or thousands of host systems, each of which has their own local trust store(s), each of which stores numerous such certs. The certs stored by these trust stores present certain security vulnerabilities, as their presence in the trust store effectively provides some level of permissioned communications access to the local host from the associated remote host. Ongoing management of these certs presents numerous challenges. For example, some certs might be revoked before their expirations if the issuing CA detects a compromise or some other issue. Some certs or Cas become obsolete, compromised, or untrusted, and if these certs are not removed from the trust store, they can pose security risks. As a number of certs in a trust store grows, the number of certs stored by the trust store leads to performance issues, such as slower certification validation processes. Manual management of trust stores increases the risk of human error, such as accidentally deleting an active cert, failing to update a cert, or misconfiguring the trust store. A "bloated" trust store increases the risk of trusting obsolete or unnecessary certs. Regular audit of the trust stores to identify and remove outdated or untrusted certs help maintain the integrity of the trust stores.

In examples, a certificate inventory (CI) system is provided. The CI system conducts a certificate inventory process on various host devices in a PKI, accessing local trust stores on the host devices to collect data about the certs that they store. The CI system includes a CI agent installed locally on each host device managed by the CI system. A CI manager communicates with each of the CI agents to perform certain inventory collection steps of the inventory process.

During cert inventory for a particular host device, the local CI agent identifies one or more trust stores operating on the host device and collects certain data that allows the CI agent to access those trust stores. For example, a trust store uses an authentication challenge before allowing local applications to obtain access to that trust store (and the certs contained therein). In some examples, this authentication challenge includes a password provided by the application, and a password verification performed by the trust store. In some examples, this authentication challenge includes a digital signature verification between the application and the trust store (e.g., encrypting nonce challenge data with a private key, which is subsequently decrypted with an associated public key for verification of the application). This password, private key, or the like, is referred to herein as a "trust store access secret" (or just "secret"), namely some protected data that allows access to the particular trust store. In some examples, this secret is a password stored in a configuration file, or a private key of a public/private key pair (a "local secret" configuration). In such examples, access to the secret can be obtained via access to a configuration file for the application, or the like. In some examples, this secret is stored and managed by a key vault (a "remote secret" configuration), and this secret is requested by the host device and provided by the key vault as needed using the local secret.

For example, presume a particular trust store uses a public/private key pair to authenticate access, and the secret is a private key stored and managed by a key vault. Further, the host device stores a configuration file that identifies both an identity of the key vault (a "key vault ID", e.g., a host name, IP address, port, or the like), a vault label (e.g., a unique identifier that is used to identify this particular key pair), and machine certification data identifying the host device (e.g., data used to authenticate access to the secret protect behind this particular vault label, such as a digital certificate signed with a private key that can be authenticated with the corresponding public key of the host). This data is collectively referred to herein as the "key vault access data" for this particular trust store.

As such, the CI agent accesses this configuration file and collects the key vault access data. In examples, the CI agent uses this key vault access data to retrieve the secret from the key vault. More specifically, the CI agent transmits a secret request message to the key vault (e.g., based on the key vault ID), where the secret request message includes the vault label and the machine certification data of this particular secret. After authenticating the secret request message, the key vault sends the secret associated with that vault label (e.g., the password or private key that enables access to the trust store on the host). Accordingly, the CI agent then uses that secret to gain access to the trust store.

In examples, once access to the trust store is established by the CI agent, the CI agent collects all the certs stored by that trust store, as well as any other metadata associated with each cert, and transmits that cert inventory data to the CI manager. The CI manager thus collects and stores the cert data from each of the trust stores. In examples, the CI manager provides a user interface (UI) that allows administrators to view and manage aspects of the certs of the trust stores, such as viewing remote host data, expiration dates, and the like. Further, the UI also allows administrators to perform administrative actions on the host devices and their associated trust stores, such as removing stale or untrusted certs, or the like. In some examples, the CI system also provides an alert manager that automatically performs certain actions, such as generating and transmitting alert messages upon detecting stale or untrusted certs, automatically removing or cancelling certs (e.g., for particular customers, providers, partners, for aged or stale certs), or the like.

In examples, the CI manager utilizes an application discovery and dependency mapping (ADDM) service to inspect the host and identify certain host-specific that is used to perform this certificate inventory. More specifically, the ADDM service scans a particular host for the software installed and operating on that host. Based on the identified software applications, the CI system identifies what trust store(s) each software application may use, thereby identifying all of the trust stores on the host. Further, the CI system also identifies the configuration files or other locations which have the password to access the trust store or the key vault access data used to acquire the password. As such, the CI system uses the ADDM service to inventory the software on each host, the configuration files for each application, the presence of all trust stores on the host, and the identity and access data for any key vaults that may be used by the host.

Such inventory management features provide technical improvements to the PKI system and its associated host devices by, for example, improving computational performance of trust stores (e.g., by removing certs, processing speed of the underlying host system is improved), reducing consumed storage (e.g., by removing certs, less storage is used by trust stores), and improving security of the host systems (e.g., by removing certs, reduces exposure to malicious attacks potentially coming from those associated remote host devices).

FIG. 1 is a block diagram of an example architecture and associated data flow for a certificate inventory (CI) system 100. In the example, the CI system includes a CI manager 110 that is configured to manage aspects of digital certificates (or just "certs") 152 stored within trust stores 150 of various host devices 120 (e.g., within an enterprise network (not separately shown)). A CI agent 112 on the example host device 120 is used to manage and execute some operational features of the CI system 100. The CI manager 110 and CI agent(s) 112 allow visibility into the certificates 152 stored on the host devices 120, as well as providing various automatic alerting and certificate management features, as described herein. While the example embodiment shown in FIG. 1 includes a CI agent 112 locally installed on the host device 120, it should be understood that an agentless architecture is also possible. For example, in an agentless architecture, any or all of the operations described as being executed by the CI agent 112 may be submitted by the CI manager 110 to the host device 120 via remote command execution (e.g., using PowerShell Remoting, PsExec, SSH, or the like).

During operation, in the example, the host device 120 executes one or more software applications 122 that communicate with an example remote host device 106. This communication is presumed to involve encrypted communications between the host device 120 and the remote host device 106 (e.g., an SSL/TLS session). Further, this encrypted communication utilizes an example cert 152X that is already established (e.g., verified by a CA, trusted, and stored) within the example trust store 150 on the host device 120 (also referred to herein as the "local host" or "local host device"). The example cert 152X is one of the certs 152 stored by the trust store 150.

In examples, the cert 152X uses public key encryption and includes at least a public key of the certificate holder (e.g., of the remote host device 106) and a subject name of the certificate holder (e.g., a fully qualified domain name (FQDN) of the remote host device 106 to which the certificate was issued), as well as possibly other cert data such as issuer name (e.g., the identity of the CA that issued the cert 152), serial number (e.g., a unique number assigned by the CA to each cert it issues), a validity period (e.g., the time frame during which the cert 152 is valid), a signature algorithm (e.g., the algorithm used by the CA to sign the cert 152), a digital signature (e.g., the signature created by the CA using the CA's own private key to sign the cert 152), certificate policies or extensions, version number, thumbprint, or the like.

When the remote host device 106 and the (local) host device 120 initially establish an encrypted communication session, the application 122 accesses the trust store 150 to retrieve the cert 152X. In some examples, the application 122 stores a secret 144 (e.g., a password or username/password credential pair) in an application config file 124 and that secret is provided by the application 122 to gain access to the trust store 150. In the example shown in FIG. 1, the application 122 stores the secret 144 in a key vault 140 remote to the host device 120. The key vault 140 is an infrastructure service of a PKI system (and of the example CI system 100) that is configured to manage secret data (e.g., passwords, private keys, or the like) on behalf of the host devices 120. In these examples, it is presumed that the secret 144 is some component of data that is used to gain access to the trust store 150. As such, when the application 122 seeks a particular cert 152X from the trust store 150, the application 122 uses an application authentication process 130 to retrieve the secret 144 from the key vault (e.g., from a secrets database 142).

More specifically, in the example, the application config file 124 stores vault ID 126, vault label data 127, and a machine certificate 128. The vault ID 126 includes data for identifying the particular key vault 140 used for this secret 144 (e.g., a host name or IP address of the key vault 140). The vault label 127 is a unique identifier established for this particular secret 144 within the key vault 140. The machine certificate 128 is a digital certificate that is used to authenticate with the key vault 140. As such, the host device 120 (e.g., via the application authentication process 130) authenticates with the key vault 140 and transmits a request for the secret 144 (e.g., using the vault label 127 for this secret 144). Once received from the key vault 140, the host device 120 uses this secret 144 to access the trust store 150. More specifically, the trust store 150 provides the example cert 152X to the application 122 (e.g., from all of the certs 152, based on a host name or IP address of the remote host device 106). Accordingly, upon receipt of the cert 152X, the application 122 uses the cert 152X to validate (e.g., trust) encrypted communication with the remote host device 106.

In the example, this application access into the trust store 150 (and its associated request to the key vault 140) is shown in broken line in FIG. 1 for purposes of illustration. Also in this example, steps associated with access into the trust store 150 by the CI system 100 is shown in solid line in FIG. 1. These certificate inventory process steps are described in greater detail below.

In the example, the CI system 100 also accesses the key vault 140 to retrieve the same secret 144, and uses that secret 144 to access the trust store 150. However, rather than requesting a particular cert 152X from the trust store 150, the CI system 100 retrieves all of the certs 152 stored by the trust store 150 and stores those certs 152 in a certificate inventory (CI) database 114.

More specifically, in the example, an inventory manager 116 initiates an inventory collection process on the host device 120. In response, the CI manager 110 performs a software inventory process on the host device 120, using an application discovery and dependency mapping (ADDM) service (or just "ADDM") 160 to identify the trust store 150 on the host device 120, as well as the presence of the example app config file 124. This software inventory process is described in greater detail below. Once the trust store 150 and app config file 124 are identified, the CI agent 112 accesses the app config file 124 to retrieve the vault ID 126, vault label 127, and machine certificate 128 for the trust store 150. In the example shown in FIG. 1, the CI agent 112 transmits the vault label 127 and machine certificate 128 to the key vault 140 (e.g., based on the identity of the key vault 140 provided by the vault ID 126) and requests the secret 144. In response, the key vault 140 authenticates the request (e.g., using the machine certificate 128 and perhaps the IP address of from which the request was received), identifies the secret 144 associated with this vault label 127, and sends the secret 144 back to the CI agent 112.

Upon receipt of the secret 144, in the example, the CI agent 112 uses the secret 144 to establish access to the trust store 150. Further, once access is established, the CI agent 112 requests and retrieves all of the certs 152 from the trust store 150. All of these certs 152 are transmitted back to the CI manager 110 for collecting a complete inventory of this example trust store 150, as well as all other trust stores 150 on this host 120, and on all of the host devices 120 managed by the CI system 100. In examples, the cert data captured for each of the certs 152 includes any or all of an authority key ID, a subject key ID, a common name, a serial number, a Sha 256 fingerprint, a PKI algorithm identifier, a key size, a signature algorithm identifier, a subject, an issuer, a valid start date, a valid expiration date, subject alternative name(s), an organization, and/or an organization unit.

As described above, during the software inventory process for a host device 120, the CI system 100 uses the ADDM 160 to discover certain host data about that host device 120. More specifically, and for example, when a host device 120 is initially integrated into the CI system 100, the CI manager 110 uses the ADDM 160 to identify all software applications 122 installed or executing on the new host device 120. For each software application identified, the CI manager 110 identifies all software applications 122 that are likely to have one or more local trust stores 150. For example, the CI manager 110 may maintain a list of commercially-available applications that are known to rely on trust stores 150 for storing certs 152. For each such app 122, the CI manager 110 also identifies any application configuration files 124 associated with that app 122, as well as the identity (e.g., location) of the associated trust store 150. In some examples, the CI manager 110 also identifies application contact data associated with the application (e.g., an email address, a mobile phone number, a ticketing system), thereby providing an avenue of contact for alerts associated with that application and the certs 152 associated with that application. In some examples, the application contact data may be stored in the app config file 124, or be provided by the ADDM 160. Further, for those apps 122 that are configured to store the secret 144 for the trust store 150 in a key vault, the CI manager 110 also identifies the key vault 140 used to manage that secret 144. Since the app config file 124 has the secret 144, or the data needed to retrieve the secret 144 from the key vault 140, the CI manager 110 thus uses the ADDM 160 to capture this host-specific data for each software application 122 on a given host (shown here as software profiles 162), forming an inventory of the trust stores 150 and associated app config files 124, vault IDs 126, vault labels 127, and machine certificates 128 for each particular host device 120 (shown here as host profile 164 for the example host device 120). In such examples, the CI manager 110 is able to dynamically discover the trust stores 150 and the data used to access those trust stores. In some examples, the CI manager 110 performs the software discovery operations of the ADDM 160 directly (e.g., via CI agent 112, remote command execution, or the like). In some examples, administrators 104 manually identify and configure, within the CI manager 110 or CI agent 112, some software applications 122, trust stores 150, and/or app config files 124 present on the host device 120 (e.g., in unconventional installations, for bespoke software applications 122, or the like).

In examples, the CI manager 110 provides a user interface (UI) 111 that allows administrators 104 (e.g., via user computing devices 102) to view and manage the certs 152 installed on the various trust stores 150 on each of the host devices 120 managed by the CI system 100. For example, the UI 111 provides a screen that shows all host devices 120 managed by the CI system 100 and, under each particular host device 120, all of the trust stores 150 present on that host device 120 and, under each particular trust store 150, all of the certs 152 present in that trust store 150. The UI 111 provides a screen that manages or analyzes all certs 152 in the certificate inventory database 114 (e.g., all certs 152 present in the CI system 100, as well as possibly data from host profiles 164), filterable and sortable by certificate holder (e.g., by subject name, remote host device, or the like), by host device 120 (e.g., host name or IP address of the host device 120), by application name (e.g., name of particular applications 122), by issuing CA (e.g., the CA that issued the particular cert 152), or any such certificate attribute data (e.g., subject, issuer, issuance date, expiry, serial number, purpose, fingerprint, and the like).

In some examples, the UI 111 allows administrators 104 to execute change operations that affect the trust stores 150 on the host devices 120. For example, the UI 111 provides a screen that allows the administrators 104 to select and remove particular certs 152 from particular selected trust stores 150 and/or on particular selected hosts 120.

In some examples, the CI manager 110 provides an alert manager 118 that is configured to automatically execute certain actions within the CI system 100 (e.g., based on certain conditions identified in the certificate inventory database 114). For example, the alert manager 118 is configured to allow the administrators 104 to configure alert messages to be automatically generated and transmitted when certs 152 are identified as stale, expired, or not recently used. In some examples, the alert manager 118 allows alert messages to be automatically generated when certs 152 are within a predetermined amount of time of expiring (e.g., expiring in the next 30, 60, or 90 days, or the like). Such expired or expiring alerts allow application managers to proactively or reactively reach out to the third party associated with that cert and get an updated cert for use. For example, the alert messages may include an email address or mobile phone number of an application focal (e.g., an application administrator) or administrator of the host device 120, and thus the application contact data may include an email or text message being sent to the contact target. In some examples, the alert messages may include opening a ticket in a ticketing system, and thus the application contact data may include a link or other indicator indicating the ticketing system. In some examples, the CI manager 110 may be configured to automatically remove, cancel, or otherwise delete certain certs 152 for particular customers, providers, partners, for aged or stale certs, from particular host devices 120 or particular trust stores 150, or such conditions. When such a situation is detected, in some examples, the CI manager 110 transmits a trust store update message to the CI agent 112 on any implicated host devices 120 identifying the operation to conduct (e.g., an action code), the particular trust store 150 on that host device 120, the particular cert(s) 152 within the trust store 150 that are subject to this operation (e.g., by subject name, issuer name, or other such cert data), and any additional modification details specific to this operation. As such, the CI system 100 is able to automatically update trust stores 150 on host devices 120 when certain conditions are met or certain situations are identified. In some examples, the CI manager 110 may automatically interact with an Information Technology Service Management (ITSM) solution (e.g., BMC Remedy/Helix ITSM, Service Now, or the like (not shown)) to create a work order or change ticket and assign to responsible acting teams (e.g., in lieu of, or in addition to, the automatic updates described above, as actionable or as documenting the automatic execution). In some examples, the CI manager 110 may be preconfigured with a set of rules that define what types of changes can be made automatically and what types of changes are managed via ITSM processes (e.g., via manual implementation of a change directed by the ITSM and/or change management system).

In some examples, the CI manager 110 provides an application programming interface (API) 113 through which the CI agent 112, hosts 120, and/or the user computing devices 102 can interface with the CI manager 110.

In some examples, the CI agent 112 is configured to automatically discover the trust stores 150 installed or otherwise present on the host device 120. In some examples, the administrators 104 may manually configure which trust stores 150 the CI agent 112 may interface.

Figure 2:
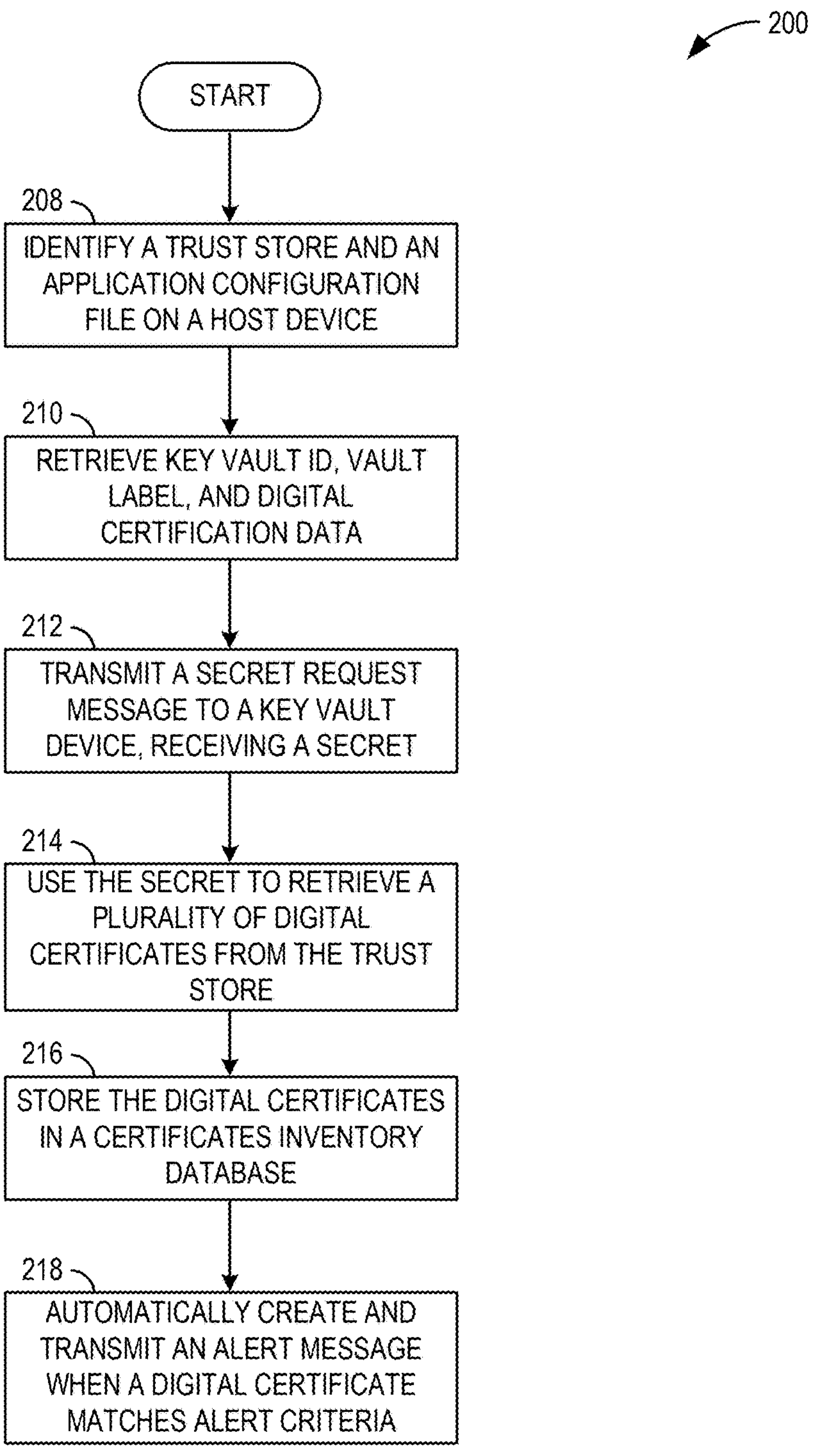
FIG. 2 is a flowchart of an example process for managing a digital certificate inventory.

FIG. 2 is a flowchart of an example process 200 for managing a digital certificate inventory. In examples, operations of the process 200 are performed by the CI system 100 of FIG. 1, such as the CI agent 112 and/or the CI manager 110, for the certs 152 stored in trust store 150 on the host device 120 of FIG. 1. At operation 208, the CI manager 110 identifies a trust store (e.g., trust store 150) present on a host device (e.g., host device 120), as well as an application configuration file having data used to access that trust store (e.g., app config file 124). In some examples, operation 208 includes using ADDM 160 to identify any or all of the software apps 122 installed on the host device 120, the trust stores 150, and/or the app config files 124. At operation 210, the CI agent 112 retrieves, from a configuration file (e.g., app config file 124) on a first device (e.g., host device 120), a key vault identifier, a vault label, and a first digital certification data, the key vault identifier identifying a key vault device (e.g., key vault 140), the vault label identifying a secret (e.g., secret 144) stored by the key vault device, the first digital certification data being usable to authenticate access to the secret. At operation 212, the CI agent 112 (or the host device 120, triggered by a remote command execution from the CI manager 110) transmits a secret request message to the key vault device, the secret request message including the vault label, thereby causing the key vault device to authenticate access to the secret based on the machine certificate and respond to the secret request message with the secret.

At operation 214, the CI agent 112 accesses a trust store (e.g., trust store 150) on the first device using the secret, the trust store includes a plurality of digital certificates (e.g., certs 152) associated with remote devices (e.g., remote host devices 106) with which the first device is configured to communicate. At operation 216, the CI manager 110 stores the plurality of digital certificates in a certificates inventory database (e.g., certificate inventory database 114), each entry in the certificates inventory database including digital certificate data associated with one of the digital certificates in the plurality of digital certificates, a host identifier identifying the first device, and a trust store identifier identifying the trust store. At operation 218, the CI manager 110 automatically creates and transmits an alert message when a first digital certificate stored in the certificates inventory database matches at least one alert criterion.

Figure 3:
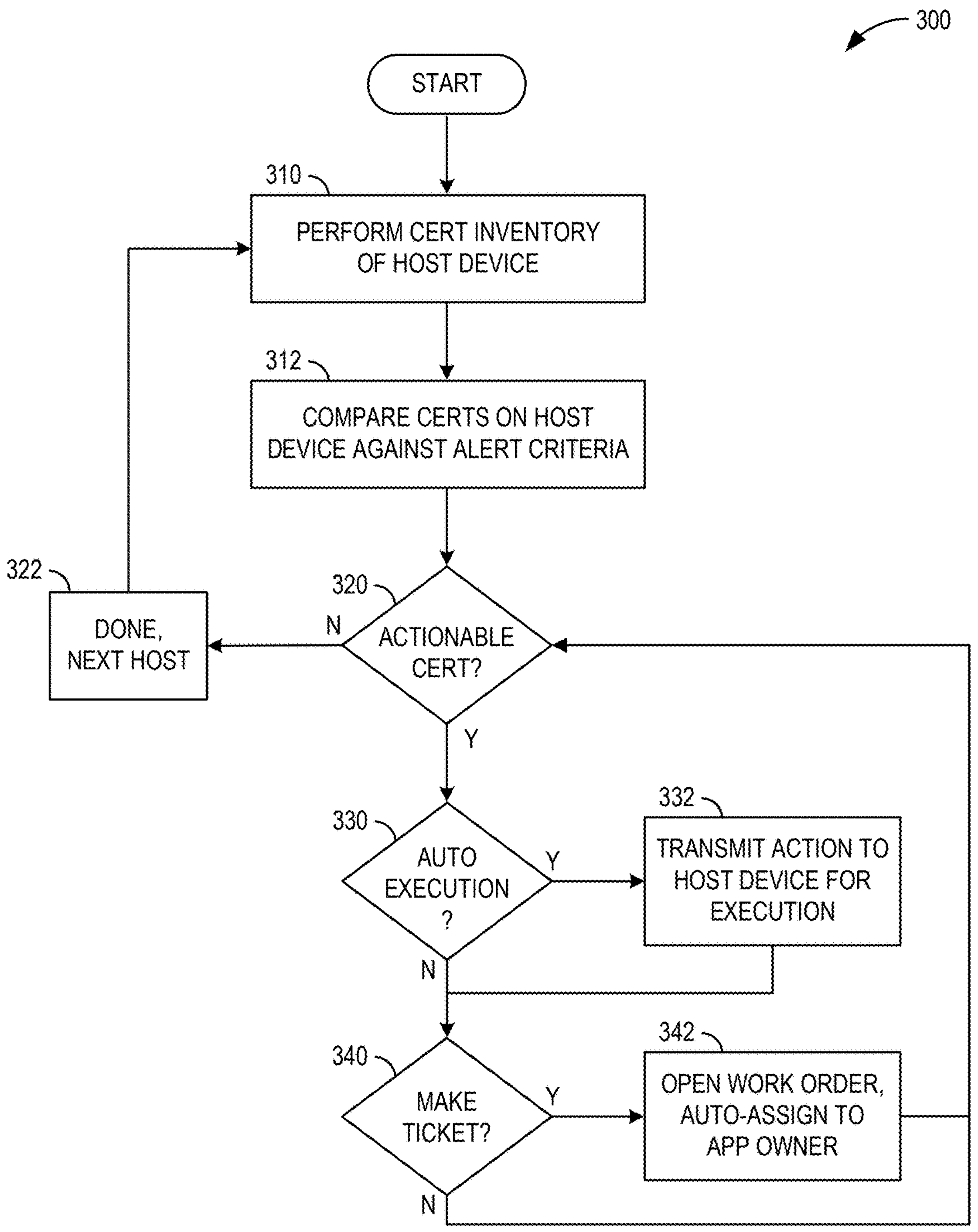
FIG. 3 is a flowchart of an example process for managing a digital certificate inventory.

FIG. 3 is a flowchart of an example process 300 for managing a digital certificate inventory. In examples, operations of the process 300 are performed by the CI system 100 of FIG. 1, such as the CI agent 112 and/or the CI manager 110, based on the certificate inventory process described above as to the host device 120 of FIG. 1. At operation 310, the CI manager 110 performs the certificate inventory of the example host device 120 (e.g., as shown and described in relation to FIG. 1 and FIG. 2). As such, it is presumed that all of the certs 152 from the trust store 150 have been collected (e.g., in database 114). At operation 312, the CI manager 110 compares the certs 152 from the host device 120 against actionable criteria or alert criteria (e.g., criteria predefined to cause the CI system 100 to automatically perform some action). In some examples, these criteria identify when to implement a new cert 152, remove an expired cert 152, or update CA chain, either automatically or via ITSM solution integration with action processes (e.g., work order, change, or the like).

At test 320, if no actionable certs have been identified, the alerting process is complete for this host device 120 and the next host device is inspected, returning to operation 310. If, at test 320, an actionable cert is identified, then the CI manager 110 evaluates whether this actionable cert is suitable for automatic execution at test 330 (e.g., based on pre-configured auto-execution rules). If the actionable cert is configured for automatic execution, the CI manager 110 transmits an action message to the host device 120 for execution (e.g., via CI agent 112 or through remote command executions).

At test 340, if the actionable cert is configured to have a ticket or work order generated (e.g., based on the pre-configured auto-execution rules), then the CI manager 110 causes an ITSM ticket to be opened (e.g., in a change management system). In examples, the ITSM ticket is automatically assigned to the application owner of the associated application, as determined by the CI manager 110 through the host profile 164 for that host device 120 and the software profiles 162 obtained by the ADDM 160.

Figure 4:
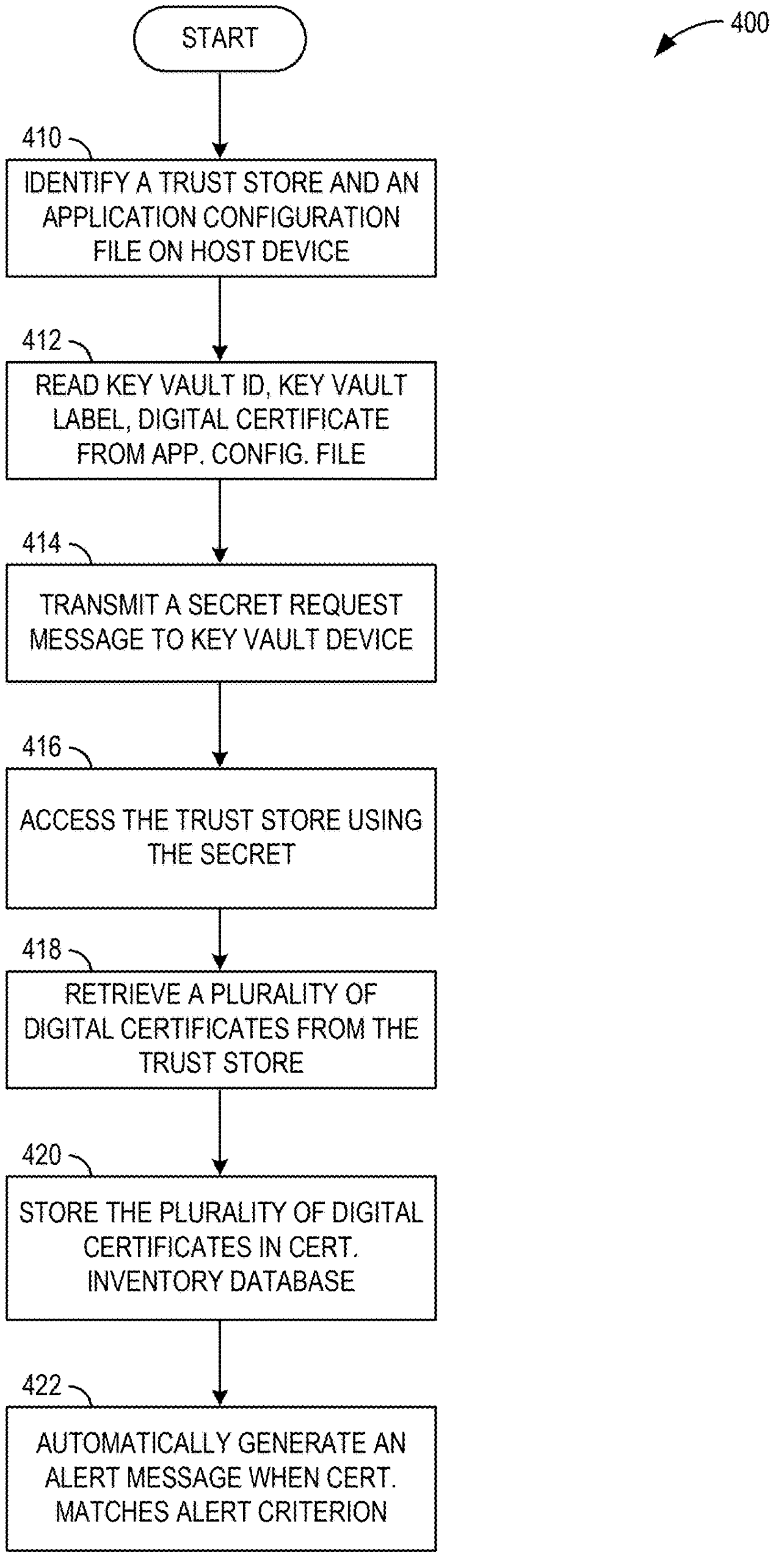
FIG. 4 is a flowchart of an example process for managing a digital certificate inventory.
Figure 5:
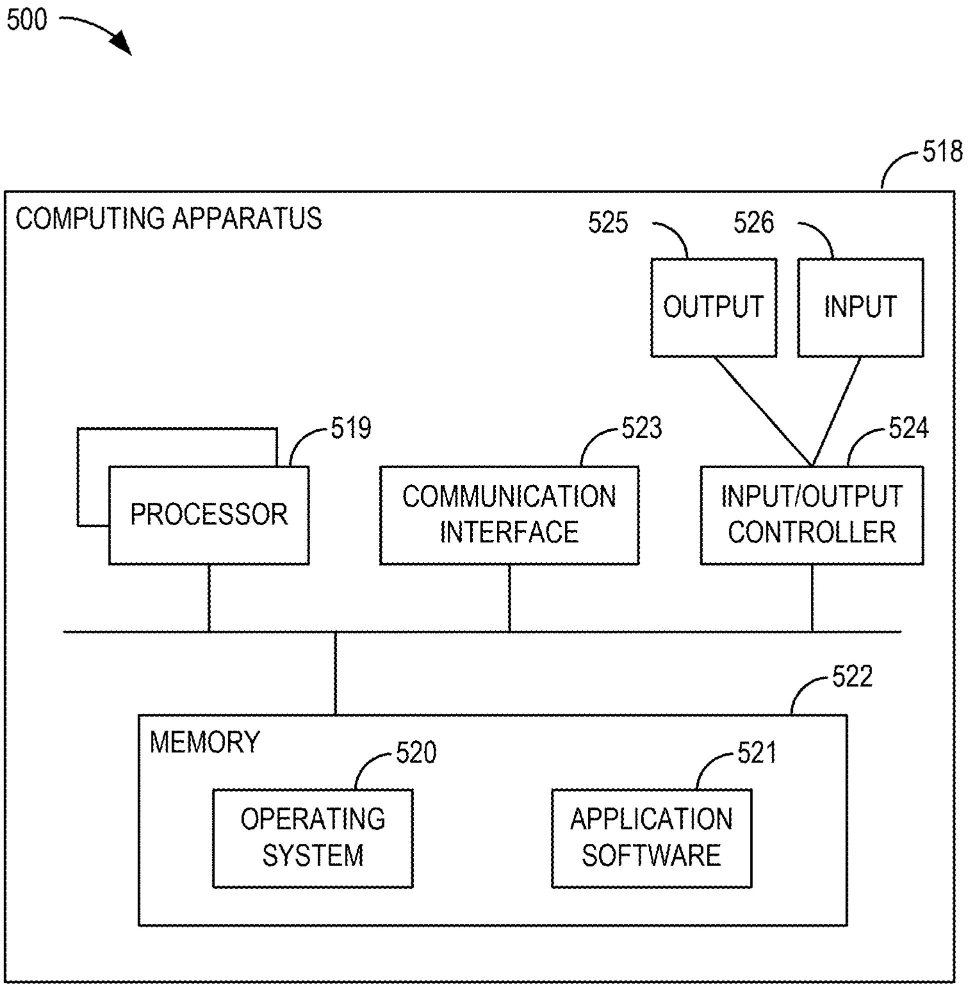
FIG. 5 is a functional block diagram of a computing apparatus according to an embodiment.

FIG. 4 is a flowchart of an example process 400 for managing a digital certificate inventory. In examples, operations of the process 400 are performed by the CI system 100 of FIG. 1, such as the CI agent 112 and/or the CI manager 110, for the certs 152 stored in trust store 150 on the host device 120 of FIG. 1. Some of the operations may cause operations to be performed on the host device 120 (e.g., via instruction from the CI manager 110 to the CI agent 112, via remote command execution initiated by the CI manager 110 for execution on the host device 120). At operation 410, the CI manager 110 identifies a trust store (e.g., trust store 150) and an application configuration file (e.g., app config 124) stored on a host device (e.g., host device 120). In some examples, said identifying includes transmitting a host profile request message (e.g., host profile 164) for the host device to an application discovery and dependency mapping (ADDM) service (e.g., ADDM 160) and receiving, in response to the host profile request message, a host profile response message that includes identification of the trust store and the application configuration file on the host device. In some examples, said identifying includes identifying an application executing on the host device based on a process currently executing on the host device, locating an application configuration file for the application based on a predefined location for that application, and retrieving a location of the trust store on the host device from the application configuration file.

At operation 412, the CI manager 110 reads, from the application configuration file, a key vault identifier (e.g., vault ID 126), a vault label (e.g., label 127), and a machine certificate (e.g., machine certificate 128), the key vault identifier identifying a key vault device (e.g., key vault 140), the vault label identifying a secret (e.g., secret 144) stored by the key vault device, the machine certificate being usable to authenticate access to the secret. At operation 414, the CI manager 110 causes the host device to transmit a secret request message to the key vault device using the key vault identifier, the secret request message including the vault label and the machine certificate, thereby causing the key vault device to authenticate access to the secret based on the machine certificate and respond to the secret request message with the secret. At operation 416, the CI manager 110 causes the trust store to be accessed using the secret.

At operation 418, the CI manager 110 causes a retrieving, from the trust store, of a plurality of host digital certificates associated with remote devices. In some examples, the retrieving, from the trust store, the plurality of host digital certificates associated with remote devices is performed by an agent executing on the host device, said retrieving further including causing the agent to transmit the plurality of host digital certificates and associated data to a certificate inventory manager device. In some examples, the retrieving, from the trust store, the plurality of host digital certificates associated with remote devices is not in response to an application-generated request, from an application associated with the trust store, to open a new network connection with a particular remote host device. In some examples, the retrieving, from the trust store, the plurality of host digital certificates associated with remote devices is performed via a remote execution command sent to the host device from a certificate inventory manager device, said retrieving further including causing the host device to transmit the plurality of host digital certificates and associated data to the certificate inventory manager device.

At operation 420, the CI manager 110 stores the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device. At operation 422, the CI manager 110 automatically generates an alert message when a first host digital certificate stored in the certificates inventory database matches at least one alert criterion. In some examples, automatically generating the alert message includes searching the certificates inventory database for host digital certificates that have an expiration date that has already elapsed, the searching identifying the host device, an expired certificate, and application contact data for an application associated with the expired certificate and transmitting the alert message based on the application contact data.

Exemplary Operating Environment

The present disclosure is operable with a computing apparatus according to an embodiment as a functional block diagram 500 in FIG. 7. In an example, components of a computing apparatus 518 are implemented as a part of an electronic device according to one or more embodiments described in this specification. The computing apparatus 518 is a computing device, such as, but not limited to, the host device 120, the CI manager 110, the remote host devices 106, and the key vault 140 in FIG. 1.

The computing apparatus 518 comprises one or more processors 519 which can be microprocessors, controllers, or any other suitable type of processors for processing computer executable instructions to control the operation of the electronic device. Alternatively, or in addition, the processor 519 is any technology capable of executing logic or instructions, such as a hardcoded machine. In some examples, platform software comprising an operating system 520 or any other suitable platform software is provided on the apparatus 518 to enable application software 521 to be executed on the device. In some examples, aspects of the disclosure may be implemented in software, hardware, and/or firmware.

In some examples, computer executable instructions are provided using any computer-readable medium or media accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 in other examples outputs data to devices other than the output device, e.g., a locally connected printing device. In some examples, a user provides input to the input device(s) 526 and/or receives output from the output device(s) 525.

Additional Examples

In some examples, a digital certificate management system comprises: at least one processor; and at least one memory comprising computer-readable instructions, the at least one processor, the at least one memory and the computer-readable instructions configured to cause the at least one processor to: dynamically identify a trust store present on a host device; retrieve, from the host device, a key vault identifier, a vault label, and a machine certificate, the key vault identifier identifying a key vault device, the vault label identifying a secret stored by the key vault device, the machine certificate being usable to authenticate access to the secret; cause the host device to transmit a secret request message to the key vault device using the key vault identifier, the secret request message including the vault label and the machine certificate, thereby causing the key vault device to authenticate access to the secret based on the machine certificate and respond to the secret request message with the secret; retrieve, from the trust store using the secret, a plurality of host digital certificates associated with remote devices with which the host device is configured to communicate; store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

In some examples, a computer-implemented method for managing a digital certificate inventory, the method comprising: identifying a trust store and an application configuration file stored on a host device; reading, from the application configuration file, a key vault identifier, a vault label, and a machine certificate, the key vault identifier identifying a key vault device, the vault label identifying a secret stored by the key vault device, the machine certificate being usable to authenticate access to the secret; causing the host device to transmit a secret request message to the key vault device using the key vault identifier, the secret request message including the vault label and the machine certificate, thereby causing the key vault device to authenticate access to the secret based on the machine certificate and respond to the secret request message with the secret; causing the trust store to be accessed using the secret; causing a retrieving, from the trust store, of a plurality of host digital certificates associated with remote devices; storing the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically generating an alert message when a first host digital certificate stored in the certificates inventory database matches at least one alert criterion.

In some examples, a computer storage medium having computer-executable instructions that, upon execution by a processor of a computer, cause the processor to at least: dynamically identify a trust store present on a host device; retrieve, from the host device, a key vault identifier, a vault label, and a machine certificate, the key vault identifier identifying a key vault device, the vault label identifying a secret stored by the key vault device, the machine certificate being usable to authenticate access to the secret; cause the host device to transmit a secret request message to the key vault device using the key vault identifier, the secret request message including the vault label and the machine certificate, thereby causing the key vault device to authenticate access to the secret based on the machine certificate and respond to the secret request message with the secret; retrieve, from the trust store using the secret, a plurality of host digital certificates associated with remote devices with which the host device is configured to communicate; store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

Alternatively, or in addition to the other examples described herein, examples include any combination of the following:

- dynamically identify a trust store present on a host device;
- retrieve, from a host device, a key vault identifier, a vault label, and a machine certificate;
- a key vault identifier identifying a key vault device;
- a vault label identifying a secret stored by the key vault device;
- a digital certificate being usable to authenticate access to the secret;
- cause a host device to transmit a secret request message to the key vault device using the key vault identifier;
- a key vault identifier being an IP address of a key vault service system;
- a secret request message including the vault label and the machine certificate;
- a secret request message causing the key vault device to authenticate access to the secret based on the machine certificate and respond to the secret request message with the secret;
- retrieve, from the trust store using the secret, a plurality of host digital certificates associated with remote devices with which the host device is configured to communicate;
- store the plurality of host digital certificates in a certificates inventory database remote from the host device;
- each entry in the certificates inventory database including digital certificate data associated with one of the host digital certificates in the plurality of host digital certificates, a host identifier identifying the host device, and a trust store identifier identifying the trust store on the host device;
- automatically create and transmit an alert message when a first host digital certificate stored in the certificates inventory database matches at least one alert criterion;
- transmitting a host profile request message for the host device to an application discovery and dependency mapping (ADDM) service;
- receiving, in response to the host profile request message, a host profile response message that includes identification of the trust store and the application configuration file on the host device;
- identifying an application executing on the host device based on a process currently executing on the host device;
- locating an application configuration file for the application based on a predefined location for that application;
- retrieving a location of the trust store on the host device from the application configuration file;

the retrieving, from the trust store using the secret, of the plurality of host digital certificates is performed by an agent executing on the host device, said retrieving further including causing the agent to transmit the plurality of host digital certificates and associated data to a certificate inventory manager device;

searching the certificates inventory database for host digital certificates that have an expiration date that has already elapsed, the searching identifying the host device, an expired certificate, and application contact data for an application associated with the expired certificate;

transmitting the alert message based on the application contact data;

the retrieving, from the trust store using the secret, the plurality of host digital certificates is not in response to an application-generated request, from an application associated with the trust store, to open a new network connection with a particular remote host device;

retrieving the key vault identifier, the vault label, and the first digital certification from a configuration file on a first device;

identifying a trust store and an application configuration file stored on a host device;

reading, from the application configuration file, a key vault identifier, a vault label, and a machine certificate, the key vault identifier identifying a key vault device, the vault label identifying a secret stored by the key vault device, the machine certificate being usable to authenticate access to the secret;

causing the host device to transmit a secret request message to the key vault device using the key vault identifier, the secret request message including the vault label and the machine certificate, thereby causing the key vault device to authenticate access to the secret based on the machine certificate and respond to the secret request message with the secret;

causing the trust store to be accessed using the secret;

causing a retrieving, from the trust store, of a plurality of host digital certificates associated with remote devices;

storing the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically generating an alert message when a first host digital certificate stored in the certificates inventory database matches at least one alert criterion.

Any range or device value given herein may be extended or altered without losing the effect sought, as will be apparent to the skilled person.

The functionality described herein can be performed, at least in part, by one or more hardware logic components. The computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

At least a portion of the functionality of the various elements in FIG. 1 to FIG. 5 can be performed by other elements in FIG. 1 to FIG. 5, or an entity (e.g., processor, web service, server, application program, computing device, etc.) not shown in FIG. 1 to FIG. 5.

In some examples, the operations illustrated in FIG. 1 through FIG. 4 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A digital certificate management system comprising:

at least one processor; and at least one memory comprising computer-readable instructions, the at least one processor, the at least one memory and the computer-readable instructions configured to cause the at least one processor to:

dynamically identify a trust store present on a host device;

retrieve, from the host device, a key vault identifier, a vault label, and a machine certificate, the key vault identifier identifying a key vault device, the vault label identifying a secret stored by the key vault device, the machine certificate being usable to authenticate access to the secret;

cause the host device to transmit a secret request message to the key vault device using the key vault identifier, the secret request message including the vault label and the machine certificate, thereby causing the key vault device to authenticate access to the secret based on the machine certificate and respond to the secret request message with the secret;

retrieve, from the trust store using the secret, a plurality of host digital certificates associated with remote devices with which the host device is configured to communicate;

store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

2. The digital certificate management system of claim 1, wherein dynamically identifying the trust store present on the host device includes:

transmitting a host profile request message for the host device to an application discovery and dependency mapping (ADDM) service; and receiving, in response to the host profile request message, a host profile response message that includes identification of the trust store and the application configuration file on the host device.

3. The digital certificate management system of claim 1, wherein dynamically identifying the trust store present on a host device includes:
identifying an application executing on the host device based on a process currently executing on the host device;
locating an application configuration file for the application based on a predefined location for that application; and
retrieving a location of the trust store on the host device from the application configuration file.

4. The digital certificate management system of claim 1, wherein the retrieving, from the trust store using the secret, of the plurality of host digital certificates is performed by an agent executing on the host device, said retrieving further including causing the agent to transmit the plurality of host digital certificates and associated data to a certificate inventory manager device.

5. The digital certificate management system of claim 1, wherein automatically creating and transmitting an alert message includes:
searching the certificates inventory database for host digital certificates that have an expiration date that has already elapsed, the searching identifying the host device, an expired certificate, and application contact data for an application associated with the expired certificate; and
transmitting the alert message based on the application contact data.

6. The digital certificate management system of claim 1, wherein the retrieving, from the trust store using the secret, the plurality of host digital certificates is not in response to an application-generated request, from an application associated with the trust store, to open a new network connection with a particular remote host device.

7. The digital certificate management system of claim 1, wherein the retrieving of the key vault identifier, the vault label, and the first digital certification further includes retrieving the key vault identifier, the vault label, and the first digital certification from a configuration file on a first device.

8. A computer-implemented method for managing a digital certificate inventory, the method comprising:
identifying a trust store and an application configuration file stored on a host device;
reading, from the application configuration file, a key vault identifier, a vault label, and a machine certificate, the key vault identifier identifying a key vault device, the vault label identifying a secret stored by the key vault device, the machine certificate being usable to authenticate access to the secret;
causing the host device to transmit a secret request message to the key vault device using the key vault identifier, the secret request message including the vault label and the machine certificate, thereby causing the key vault device to authenticate access to the secret based on the machine certificate and respond to the secret request message with the secret;
causing the trust store to be accessed using the secret;
causing a retrieving, from the trust store, of a plurality of host digital certificates associated with remote devices;
storing the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and
automatically generating an alert message when a first host digital certificate stored in the certificates inventory database matches at least one alert criterion.

9. The computer-implemented method of claim 8, wherein identifying the trust store and the application configuration file present on a host device includes:
transmitting a host profile request message for the host device to an application discovery and dependency mapping (ADDM) service; and
receiving, in response to the host profile request message, a host profile response message that includes identification of the trust store and the application configuration file on the host device.

10. The computer-implemented method of claim 8, wherein identifying the trust store and the application configuration file present on a host device includes:
identifying an application executing on the host device based on a process currently executing on the host device;
locating an application configuration file for the application based on a predefined location for that application; and
retrieving a location of the trust store on the host device from the application configuration file.

11. The computer-implemented method of claim 8, wherein the retrieving, from the trust store, the plurality of host digital certificates associated with remote devices is performed by an agent executing on the host device, said retrieving further including causing the agent to transmit the plurality of host digital certificates and associated data to a certificate inventory manager device.

12. The computer-implemented method of claim 8, wherein automatically generating an alert message includes:
searching the certificates inventory database for host digital certificates that have an expiration date that has already elapsed, the searching identifying the host device, an expired certificate, and application contact data for an application associated with the expired certificate; and
transmitting the alert message based on the application contact data.

13. The computer-implemented method of claim 8, wherein the retrieving, from the trust store, the plurality of host digital certificates associated with remote devices is not in response to an application-generated request, from an application associated with the trust store, to open a new network connection with a particular remote host device.

14. The computer-implemented method of claim 8, wherein the retrieving, from the trust store, the plurality of host digital certificates associated with remote devices is performed via a remote execution command sent to the host device from a certificate inventory manager device, said retrieving further including causing the host device to transmit the plurality of host digital certificates and associated data to the certificate inventory manager device.

15. A computer storage medium having computer-executable instructions that, upon execution by a processor of a computer, cause the processor to at least:
dynamically identify a trust store present on a host device;
retrieve, from the host device, a key vault identifier, a vault label, and a machine certificate, the key vault identifier identifying a key vault device, the vault label identifying a secret stored by the key vault device, the machine certificate being usable to authenticate access to the secret;

cause the host device to transmit a secret request message to the key vault device using the key vault identifier, the secret request message including the vault label and the machine certificate, thereby causing the key vault device to authenticate access to the secret based on the machine certificate and respond to the secret request message with the secret;

retrieve, from the trust store using the secret, a plurality of host digital certificates associated with remote devices with which the host device is configured to communicate;

store the plurality of host digital certificates in a certificates inventory database remote from the host device, each entry in the certificates inventory database including digital certificate data associated with one of the host digital certificates in the plurality of host digital certificates, a host identifier identifying the host device, and a trust store identifier identifying the trust store on the host device; and automatically create and transmit an alert message when a first host digital certificate stored in the certificates inventory database matches at least one alert criterion.

16. The computer storage medium of claim 15, wherein dynamically identifying the trust store present on a host device includes:

transmitting a host profile request message for the host device to an application discovery and dependency mapping (ADDM) service; and receiving, in response to the host profile request message, a host profile response message that includes identification of the trust store on the host device.

17. The computer storage medium of claim 15, wherein dynamically identifying the trust store present on a host device includes:

identifying an application executing on the host device based on a process currently executing on the host device;

locating an application configuration file for the application based on a predefined location for that application; and retrieving a location of the trust store on the host device from the application configuration file.

18. The computer storage medium of claim 15, wherein the retrieving, from the trust store using the secret, of the plurality of host digital certificates is performed by an agent executing on the host device, said retrieving further including causing the agent to transmit the plurality of host digital certificates and associated data to a certificate inventory manager device.

19. The computer storage medium of claim 15, wherein automatically creating and transmitting an alert message includes:

searching the certificates inventory database for host digital certificates that have an expiration date that has already elapsed, the searching identifying the host device, an expired certificate, and application contact data for an application associated with the expired certificate; and transmitting the alert message based on the application contact data.

20. The computer storage medium of claim 15, wherein the retrieving, from the trust store using the secret, the plurality of host digital certificates is not in response to an application-generated request, from an application associated with the trust store, to open a new network connection with a particular remote host device.

* * * * *